(12) United States Patent
Cermak et al.

(10) Patent No.: US 7,983,188 B2
(45) Date of Patent: Jul. 19, 2011

(54) MONITORING PORTAL SYSTEMS AND METHODS

(75) Inventors: Gregory Wayne Cermak, Needham, MA (US); Robert Anthony Virzi, Wayland, MA (US); Rebecca S. Burd, Groveland, MA (US); Edward M. Eggerl, Catonsville, MD (US); Gregory Keith Evans, Clarksville, MD (US); Douglas Reynold Jones, Medford, NJ (US); William E. Garrett, Framingham, MA (US); William David Goodman, Collegeville, PA (US); Allison Dana Jaynes, New City, NY (US); Margaret Malagon, Gulph Mills, PA (US); Robert Edward Opaluch, Riverside, RI (US); Timothy Wayne Schmidt, Wilton, CT (US); James Francis Sorce, Needham, MA (US); Michael Alan Weintraub, Medfield, MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 12/686,923

(22) Filed: Jan. 13, 2010

(65) Prior Publication Data

US 2010/0110927 A1    May 6, 2010

Related U.S. Application Data

(63) Continuation of application No. 11/253,740, filed on Oct. 20, 2005, now Pat. No. 7,664,083.

(60) Provisional application No. 60/629,159, filed on Nov. 18, 2004.

(51) Int. Cl.
   *H04L 12/26* (2006.01)

(52) U.S. Cl. ......... 370/252; 370/338; 719/310; 709/218

(58) Field of Classification Search ................. 370/252, 370/292, 338, 229; 455/405
   See application file for complete search history.

(56) References Cited

U.S. PATENT DOCUMENTS

2002/0138296 A1*   9/2002   Holmes, Jr. ................... 705/1
* cited by examiner

*Primary Examiner* — David Q Nguyen (57) ABSTRACT

In one of many possible embodiments, a system includes a monitoring portal configured to receive state information descriptive of usage of a plurality of communication services provided on a plurality of communication networks of different types and to make the state information available to a subscriber of the plurality of communication services, in substantially real time.

21 Claims, 4 Drawing Sheets

MONITORING PORTAL SYSTEMS AND METHODS

CROSS REFERENCE TO RELATED APPLICATIONS

This application is a continuation of currently pending U.S. patent application Ser. No. 11/253,740, filed on Oct. 20, 2005, which in turn claims priority to U.S. Application Ser. No. 60/629,159, filed Nov. 18, 2004, both of which are hereby incorporated by reference in their entirety.

BACKGROUND INFORMATION

Modern technology has made many different types of communication devices, services, networks, and media available to consumers. Accordingly, people have generally become more "connected" than ever before. For example, typical consumers may subscribe to or otherwise use several different types of communication services such as local and long distance telephone, wireless telephone (e.g., cellular), wireless text messaging, instant messaging, Internet access, e-mail, and chat room services, to name several more prominent types of available communication services.

Along with the proliferation of these and other communication services, interest in monitoring and/or controlling usage and content of the services has developed. For example, many parents wish to monitor their children's use of communication services to ensure that the children are not exposed to objectionable materials or malicious persons. Parents may also wish to monitor their children's use of communication services in order to control costs or to know in what activities their children are engaged. By way of example, a parent may wish to know whether a child who is supposed to be doing homework is instead watching television, talking on the telephone, or instant messaging.

Many parental control tools have emerged to help parents or supervisors monitor activities conducted using communication services. For example, some Internet service providers offer content filters for monitoring and blocking objectionable content contained in Internet protocol ("IP") packets. Third-party software also exists for monitoring the content of IP packets associated with communication services such as e-mail, chat rooms, and instant messaging. However, existing parental control tools are limited to monitoring certain types of communication services. For example, certain existing tools monitor only specific communication services provided over Internet protocol based ("IP-based") networks such as the Internet. Other existing tools are limited to blocking entertainment content provided over cable television networks. Consequently, existing parental control tools are not capable of robustly monitoring usage of a variety of different types of communication services provided over different types of communication networks.

In particular, many existing tools fail to provide any capability for monitoring usage of communication services over networks that are not based on the Internet protocol. For example, existing tools do not support monitoring of many of the communications services commonly provided over landline and wireless telephone networks. Thus, parents do not have tools available for real-time or near real-time monitoring of the usage of a landline telephone or wireless telephone service; for example.

Because a home, business, or other entity is typically connected to several different types of communication networks (e.g., a landline telephone network, a wireless telephone network, the Internet, and a cable television network), parents or supervisors currently lack tools capable of monitoring usage of many different types of communication services available to children or employees. Moreover, having to use or subscribe to multiple parental control tools is inconvenient, costly, and, undesirable to many parents.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

DETAILED DESCRIPTION OF PREFERRED EMBODIMENTS

I. Overview

Preferred embodiments according to the present invention may be implemented as systems and methods for monitoring usage of communication services over multiple types of communication networks. State information for the communication services may be obtained from communication network devices and/or media. As used herein, the term "state information" is meant to be interpreted broadly to include any information descriptive of, or that may be useful for determining, usage of a communication service. "Usage" of a communication service is meant to be understood broadly to include any information related to the communication service, including, but not limited to, information concerning the duration of, parties to, content of, and/or activities associated with the communication service. Once obtained, the state information may be combined by an aggregation engine and provided to a monitoring portal in aggregate form. The monitoring portal may present the aggregate state information to an access device so that a user of the access device can access the state information to analyze usage of the communication services. The monitoring portal may be configured to present real-time, near real-time, and/or historical data to the access device.

The monitoring portal provides users with a single access point for accessing data representative of the usage of communication services over multiple types of communication networks. The data can be organized in any manner, including by subscriber account or by a particular individual on the subscriber account. For example, the monitoring portal allows a parent to access current and/or historical usage of all of the communication services (e.g., landline telephone, wireless telephone, instant messaging, and other services) subscribed to by the parent that have been associated with the monitoring portal. Thus, the monitoring portal is configured to provide consolidated usage information at a single access point for convenient access by a user.

As used herein, the term "communication network" is meant to be understood broadly to include any configuration of communication devices and/or media used for propagating communication signals between endpoints. The communication signals may include data, voice, programming content, overhead, protocol, media, video, and any other type of content. Communication networks may be any form or type of network capable of carrying communications signals. A "type" of communication network is meant to distinguish communication networks by the protocols and/or media used therein. For example, different types of communication networks may include, but are not limited to, IP-based networks such as the Internet, other packet-switched networks, public switched telephone networks ("PSTNs"), wireless telephone networks, cable networks, and satellite networks.

Exemplary systems, as well as an exemplary process that may be performed by the systems, will now be described in detail.

II. High-Level View of an Exemplary Monitoring System

Figure 1:
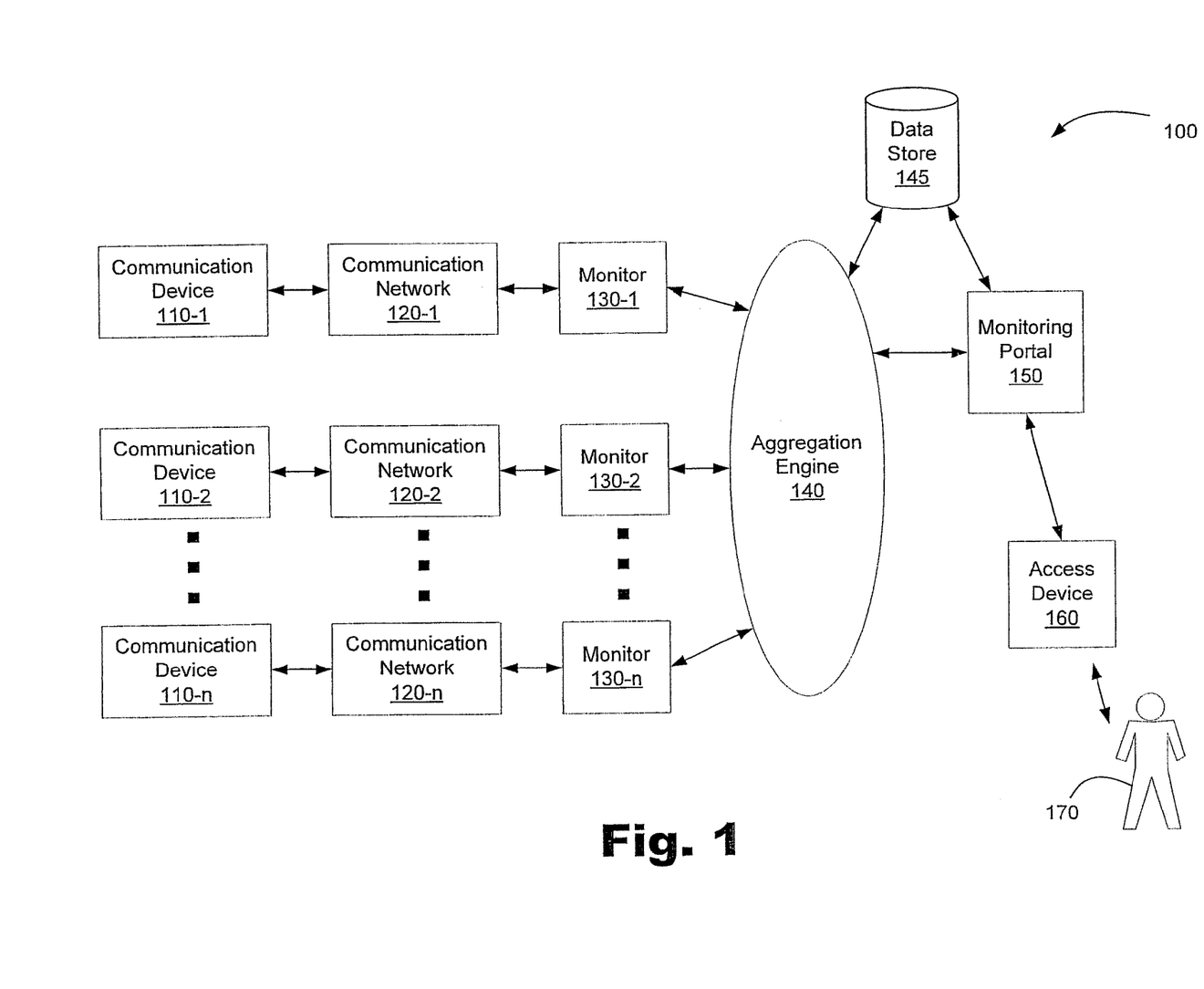
FIG. 1 is a block diagram illustrating at a high level an exemplary system for monitoring communication service usage on multiple communication networks, according to one embodiment.

Turning now to the figures, FIG. 1 is a block diagram illustrating at a high level an exemplary system 100 for monitoring usage of communication services on multiple communication networks, according to one embodiment. As shown in FIG. 1, the system 100 may include one or more communication devices 110-1 through 110-n (collectively the "communication devices 110") in communication with one or more communication networks 120-1 through 120-n (collectively the "communication networks 120"), respectively. One or more monitors 130-1 through 130-n (collectively the "monitors 130") may monitor state information associated with communication services provided over the respective communication networks 120-1 through 120-n. The monitors 130 may be configured to provide the state information to an aggregation engine 140, which may be configured to process and combine the state information into aggregate form. The aggregate state information may be stored in and retrieved from a data store 145 communicatively coupled to the aggregation engine 140. The aggregate state information may be provided from the aggregation engine 140 and/or the data store 145 to a monitoring portal 150, which can put the aggregate state information in suitable form for transmission to an access device 160. A user 170 may use the access device 160 to access the aggregate state information. Each of the elements shown in FIG. 1 will now be described in more detail.

A. Communication Devices

Each of the communication devices 110 may include one or more devices capable of communicating with one or more of the communication networks 120. The communication devices 110 may include, but are not limited to, cellular telephones, personal digital assistants, laptop computers, desktop computers, network interface cards, modems, personal computers, dedicated computer devices, gaming stations, e-mail enabled devices, satellite pagers, Internet devices, embedded computers, video phones, mainframe computers, mini-computers, programmable logic devices, vehicles, entertainment devices, media devices; set-top boxes, televisions, landline telephones, SIP telephones, wireless communication devices, non-wireless communication devices, text messaging devices, multimedia devices, gateways, switches, routers, and networking-enable devices.

In some embodiments, the communication devices 110 function as one or more endpoints to communications sent and received over one or more of the communication networks 120. For example, the communication device 110-1 may comprise a cellular telephone configured to send and receive radio communications over the communication network 120-1, which may include a cellular network. In other embodiments, the communication devices 110 may be intermediary devices along communication paths. For example, the communication devices 110 may comprise one or more gateways from the communication networks 120 to other types of communication networks.

B. Communication Networks

The communication networks 120 may comprise any type and/or form of networks capable of carrying communication signals between endpoints. The communication networks 120 may include, but are not limited to, landline networks, PSTNs, wireless networks, cellular telephone networks, pico-networks (e.g., devices communicating by Bluetooth or functionally similar network protocols), cable networks, satellite networks, television networks, SS7-based networks, IP-based networks, the Internet, LANs, WANs, and other packet-based networks.

In many embodiments, each of the communication networks 120-1 through 120-n comprises a different type of communication network. In one embodiment, for example, communication network 120-1 comprises a wireless telephone network (e.g., a cellular telephone network), communication network 120-2 comprises a PSTN, and communication network 120-n comprises one or more IP-based networks.

The communication networks 120 may include any configuration of network elements and transmission media. For example, the communication networks 120 may include, but are not limited to, network elements such as routers, gateways, switches, base stations, mobile switching centers ("MSCs"), repeaters, access points, service control points ("SCPs"), storage service providers ("SSPs"), service transfer points ("STPs"), and any other network device known to those skilled in the art. The communication networks 120 may utilize transmission media such as any wireless media, cable (e.g., fiber optic or coaxial cable), standard telephone lines (twisted pair), and any other transmission media known to those skilled in the art.

The communication devices 110 may access the communication networks 120 using any suitable access technologies. For example, access to IP-based communication networks may be by dial-up, DSL, fiber to the premises, wireless access points, and any other known access technology. Specific examples of several types of communication networks 120 will be described further below.

C. Monitors

The monitors 130 may comprise any device and/or executable logic (e.g. software and/or firmware) configured to monitor and obtain state information associated with communication services provided over the communication networks 120. The monitors 130 may be configured to monitor state information in real time or at least near real time. Known technologies for monitoring may be employed, including any technologies typically used for monitoring usage of communication services for billing purposes.

The monitors 130 may obtain state information associated with communication services at any suitable point on the communication networks 120. For example, the monitors 130 may monitor signals or communication channels at the communication devices 110, network elements, and/or transmission media associated with the communication networks 120.

The monitors 130 may be in the form of separate hardware devices connected to network elements of the communication networks 120, or the monitors 130 may be implemented in the network elements. In particular, network elements may be configured with monitoring capabilities. In packet-switched networks for example, routers may be configured with capabilities for monitoring state information associated with communication signals passing through the routers. The monitors 130 may include proxy servers and/or firewalls configured to collect state information.

Regardless of how the monitors 130 gather state information descriptive of communication service usage over the communication networks 120, the monitors 130 may be equipped to forward data representative of the state information to the aggregation engine 140. The data may be forwarded over any suitable connection(s) to the aggregation engine 140. In many embodiments, for example, the monitors 130 are configured to access the Internet, either directly or indirectly. Accordingly, the monitors 130 may be configured to format the data into suitable form for transmission over the Internet and then send the data to the aggregation engine 140 via the Internet. Other suitable connections (e.g., wireless connections such as those provided by cellular networks, landline networks, and other IP-based networks such as LANs) may be used in other embodiments for transmission of state information from the monitors 130 to the aggregation engine 140.

D. Aggregation Engine

The aggregation engine 140 may be configured to process state information received from the monitors 130. The aggregation engine 140 may be configured to process the received data in order to change it from one or more initial formats (e.g., advanced intelligent network transaction capability application part ("AIN TCAP"), IS-41 TCAP, asynchronous transfer mode ("ATM") format, digital subscriber line ("DSL") format, or other known format) into another format (e.g., extensible mark-up language ("XML")). In some embodiments, processing is performed, while in other embodiments, the received state information is in a format ready for aggregation.

The aggregation engine 140 may combine the state information into aggregate form, referred to as aggregate state information. The aggregation engine 140 may combine the state information by subscriber to group different services provided on different types of communication networks into an aggregate description of usage of the communication services subscribed to by a subscriber. By combining monitored state information from multiple monitors 130 into aggregate form, state information for multiple communication services over multiple different types of communication networks 120 can be presented to the user 170 at a single access point, as described below.

The aggregation engine 140 may be implemented using any suitable technologies. In some embodiments, for example, the aggregation engine 140 is in the form of an application server executing predefined logic (e.g., software and/or firmware) configured to instruct the combining of the received state information. In some embodiments, the aggregation engine 140 includes a proxy server and/or a firewall. In other embodiments, the aggregation engine 140 may be implemented on other suitable computing devices.

While FIG. 1 shows a single aggregation engine 140, those skilled in the art will understand that this does not limit aggregation of the state information to a single level of aggregation. For example, one or more aggregation engines 140 may be configured to hierarchically combine state information received from multiple monitors 130.

E. Data Store

The data store 145 may comprise one or more storage media, devices, or configurations, including databases. The data store 145 may employ any type, form, and combination of storage media known to those skilled in the art, including hard disk drives, read-only memory, and random access memory. The data store 145 may include any known technologies useful for storing and accessing information and may be integrated within or be external to the aggregation engine 140 or the monitoring portal 150. The aggregation engine 140 and the monitoring portal 150 can communicate with the data store 145 using any known media and protocols.

The data store 145 may be configured to store data representative of aggregate state information received from the aggregation engine 140. The stored data may be accessed by the aggregation engine 140 and/or the monitoring portal 150. For example, to fulfill a user request, the monitoring portal 150 may retrieve information stored in the data store 145 and forward the retrieved information to the access device 160. The data store 145 enables presentation of historic state information to the user 170.

F. Monitoring Portal

The aggregation engine 140 may be configured to transmit data representative of aggregate state information to the monitoring portal 150. In some embodiments, the data is transmitted in XML format. Any suitable connection may be used for carrying data between the aggregation engine 140 and the monitoring portal 150. The monitoring portal 150 may also retrieve state information from the data store 145, as mentioned above.

The monitoring portal 150 is configured to make the aggregate state information available to the user 170 through the access device 160. The monitoring portal 150 may be configured to format the aggregate state information into any suitable format for transmission to the access device 160. In some embodiments, for example, the monitoring portal 150 may include one or more web servers configured to insert the aggregate state information into predefined templates (e.g., HTML templates), which may be transmitted to the access device 160. The templates or data therein may be transmitted automatically to the access device 160 (e.g., to refresh the information) or in response to a request received from the access device 160.

The monitoring portal 150 is not limited to a web server implementation. The monitoring portal 150 may comprise any technology or technologies suitable for providing aggregate state information to the user 170 through a single access point. In some embodiments, for example, the monitoring portal 150 may provide voice portal capabilities that allow the user 170 to access state information over a telephone or other voice-supported network. In one embodiment, the monitoring portal 150 is configured to provide both web access and telephone access. Telephone access may be provided as a backup to web access.

G. Access Device

The access device 160 can include any device or devices physically accessible to the user 170 or that otherwise allow the user 170 to provide input to, receive information from, or otherwise access the monitoring portal 150. The access device 160 may include, but is not limited to, one or more desktop computers, laptop computers, tablet computers, personal data assistants, cellular telephones, satellite pagers, wireless Internet devices, embedded computers, video phones, mainframe computers, mini-computers, workstations, network interface cards, programmable logic devices, entertainment devices, gaming devices, client devices, mobile telephones, landline telephones, SIP telephones, multimedia devices, and any other access device capable of communicating with the monitoring portal 150. The access device 160 may include various peripherals such as a terminal, keyboard, mouse, screen, printer, stylus, input device, output device, or any other apparatus that can help relay information between the user 170 and the monitoring portal 150.

The access device 160 may be configured to present data received from the monitoring portal 150 for consideration and/or use by the user 170. For example, the access device 160 may provide one or more user interfaces (e.g., graphical user interfaces, known Internet browsers, and/or voice interfaces) capable of presenting the aggregate state information to the user 170.

The access device 160 may be located proximate to or remote from the monitoring portal 150. The access device 160 and the monitoring portal 150 may communicate using any known media and protocols. In some embodiments, the access device 160 comprises a client device configured to communicate with the monitoring portal 160 over a network (e.g., the Internet). In other embodiments, the access device 160 comprises peripheral devices connected to the monitoring portal 150.

While FIG. 1 shows only one access device 160, this is only for purposes of illustration and is not intended to be limiting. Other embodiments may include multiple access devices 160 in communication with the monitoring portal 150.

H. User

The user 170 is typically a human being who can utilize the access device 160 to input information to and/or consider output from the monitoring portal 150. However, the user 170 may be another living organism, an automated agent, or some form of intelligence technology that is configured to analyze information received from the monitoring portal 150. Typically, the user 170 is in physical proximity to the access device 160. The user 170 may be a parent, an individual having a supervisory role, or a subscriber to communications services.

While an exemplary system 100 is shown in FIG. 1, those skilled in the art will recognize that the system 100 illustrated in the Figure is not intended to be limiting. Indeed, those skilled in the art will recognize that other alternative hardware environments and implementations may be used. In particular, although FIG. 1 illustrates only one access device 160 and user 170, those skilled in the art will understand that multiple access devices 160 and multiple users 170 may concurrently access the monitoring portal 150. Accordingly, the monitoring portal 150 may be provided as a service to multiple subscribers. In addition, those skilled in the art will also understand that multiple communication devices 110 may be connected to each of the communication networks 120.

III. Another View of an Exemplary Monitoring System

Figure 2:
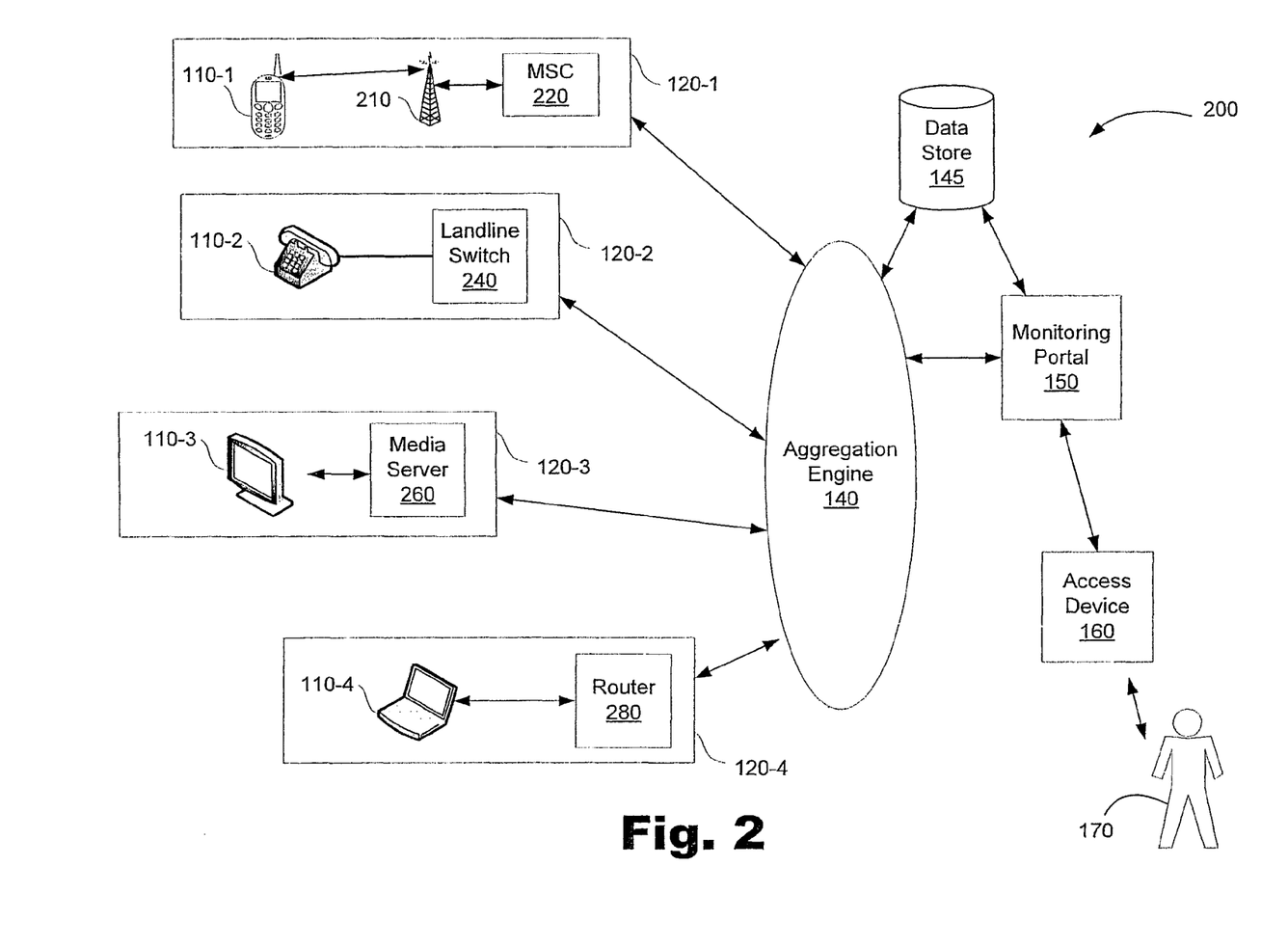
FIG. 2 is a block diagram of another exemplary communication monitoring system, according to one embodiment.

FIG. 2 is a block diagram of another exemplary communication monitoring system 200, according to one embodiment. As shown in FIG. 2, the system 200 may include different types of communication networks 120-1 through 120-4. In the embodiment shown in FIG. 2, communication network 120-1 comprises a wireless telephone network (e.g., a cellular telephone network), communication network 120-2 comprises a landline telephone network (e.g., a PSTN), communication network 120-3 comprises a broadcast media network (e.g., a cable or satellite media broadcasting network), and communication network 120-4 comprises an IP-based network (e.g., the Internet). The communication networks 120 are able to obtain and communicate state information associated with the services provided over the communication networks 120 to the aggregation engine 140. Each of the specific examples of communication networks 120 shown in FIG. 2 will now be described in additional detail.

A. Wireless Telephone Network

The wireless telephone network represented as communication network 120-1 in FIG. 2 may include a base station 210 in communication with one or more communication devices 110-1. The base station 210 may also communicate with a mobile switching center ("MSC") 220. As known to those skilled in the art, the base station 210 and the MSC 220 can be configured to support wireless communications to and from communication devices 110-1 within the physical range of the base station 210. However, the illustration of a single base station 210 in FIG. 2 is not limiting; additional base stations 210 may be strategically positioned to provide signal coverage over a broad area. As known in the art, the MSC 220 can route communication signals to appropriate base stations 210 in accordance with the location of a particular communication device 110-1 within the area covered by the wireless network.

In many embodiments, the communication network 120-1 comprises a cellular telephone network. Any cellular telephone network technologies known in the art can be used, including, but not limited to, digital, analog, Time Division Multiple Access ("TDMA"), Code Division Multiple Access ("CDMA"), Global System for Mobile Communication ("GSM"), and the like.

State information associated with communication services (e.g., voice, text messaging, Internet access, e-mail, etc.) provided over the wireless telephone network may be collected at any suitable point in the communication network 120-1. By way of example, the communication device 110-1, the base station 120, an access node, and/or the MSC 220 may be configured to obtain state information. In particular, executable logic for monitoring state information may be implemented in any of these network elements. Alternatively, separate monitors 130 (not shown in FIG. 2) may be implemented in the communication network 120-1 and configured to monitor state information. In one embodiment, the MSC 220 is configured to monitor state information associated with communication services provided over the communication network 120-1.

Any of the network elements of the wireless telephone network may be communicatively coupled to the aggregation engine 140, either directly or indirectly. For example, any of the network elements on the wireless telephone network may be configured to connect to the Internet and to provide state information to the aggregation engine 140 via the Internet. In some embodiments, an IP/Cellular gateway (not shown) may be used to interface wireless telephone network elements with the aggregation engine 140. In one embodiment, for example, the MSC 220 is configured to gather and transmit state information to the IP/Cellular gateway, which may be configured to format the state information from cellular signals (e.g., IS-41 TCAP) to another format (e.g., IP-based signals such as XML) for transmission to the aggregation engine 140. In other embodiments, the aggregation engine 140 may be configured to perform data format translation functions to convert cellular signals to another format.

B. Landline Telephone Network

The landline telephone network represented as communication network 120-2 in FIG. 2 may include a landline switch 240 in communication with one or more communication devices 110-2. As known to those skilled in the art, the landline switch 240 can be configured to control communication channels to and from the communication devices 110-2.

In many embodiments, the landline telephone network comprises a PSTN or other legacy telephone network. Accordingly, the landline switch 240 may include any form of switch known to be used in PSTNs, including, but not limited to, end office switches, remote switches, tandem switches, and traffic operator position system ("TOPS") switches. The illustration of a single landline switch 240 in FIG. 2 is not limiting; the communication network 120-2 of FIG. 2 may include multiple landline switches 240, as is usually the case in PSTNs. In addition, multiple communication devices 110-2 may be connected to each landline switch 240.

State information associated with communication services (e.g., voice) provided over the landline telephone network may be collected at any suitable point in the communication network 120-2. The communication device 110-2, the landline switch 240, and/or some other network element in the landline telephone network may be configured to obtain state information. For example, executable logic for monitoring state information may be implemented in any landline switch 240. In one embodiment, the landline switch 240 is configured with tools for monitoring state information. In other embodiments, separate monitors 130 (not shown in FIG. 2) may be implemented in the communication network 120-2 and configured to monitor state information.

Any of the network elements of the landline telephone network may be communicatively coupled to the aggregation engine 140, either directly or indirectly. For example, any of the network elements of the landline telephone network may be configured to connect to the Internet and to provide state information to the aggregation engine 140 via the Internet. In some embodiments, an IP/PSTN gateway (not shown) may be used to interface landline telephone network elements with the aggregation engine 140. In one embodiment, for example, the landline switch 240 is configured to gather and transmit state information to the IP/PSTN gateway, which may be configured to translate the state information from landline telephone signals (e.g., AIN TCAP) to another format (e.g., IP-based signals such as XML) for transmission to the aggregation engine 140. In other embodiments, the aggregation engine 140 may be configured to perform data format translation functions to convert landline telephone signals to another format.

C. Broadcast Media Network

As shown in FIG. 2, the communication network 120-3 may comprise a broadcast media network such as a cable or satellite television network, to name just two examples. The broadcast media network may include a media server 260 configured to communicate with one or more communication devices 110-3. The media server 260 may include any device configured to deliver media content to the communication devices 110-3. For example, the media server 260 may comprise any known cable head-end unit, satellite head-end unit, or video server (e.g., a video-on-demand server).

Any device or devices in the broadcast media network may be configured to monitor and obtain state information associated with communication services, including content media, provided over the network 120-3. In some embodiments, for example, the media server 260 is configured with tools (e.g., software, firmware, and/or hardware) for obtaining state information. In other embodiments, the communication devices 110-3 are configured with tools for obtaining state information. In yet other embodiments, separate monitors 130 (not shown in FIG. 2) are included in the broadcast media network for obtaining state information.

The collected state information can be transmitted from a device of the communication network 120-3 to the aggregation engine 140, either directly or indirectly. For example, any of the network devices (e.g., the media server) on the broadcast media network may be configured to connect to the Internet and to transmit state information to the aggregation engine 140 via the Internet. In some embodiments, an IP/media network gateway (not shown) may be used to interface broadcast media network elements with the aggregation engine 140. In one embodiment, for example, the media server 260 is configured to monitor and transmit state information to the IP/media network gateway, which may be configured to format the state information from broadcast media signals (e.g., ATM) to another format (e.g., IP-based signals such as XML) for transmission to the aggregation engine 140. In other embodiments, the aggregation engine 140 may be configured to perform data format translation functions to convert broadcast media signals to another format.

D. IP-Based Network

In the system 200 shown in FIG. 2, the communication network 120-4 may comprise an IP-based network such as the Internet or a LAN, for example. The IP-based network may include a router 280 configured to communicate with one or more communication devices 110-4. The router 280 may include any device configured to send and receive packetized signals to/from the communication devices 110-4. For example, the router 280 may comprise any known service edge router, application edge router, peering router, and other type of known routing device. The illustration of the router 280 in FIG. 2 is for illustrative purposes and is not intended to be limiting; the IP-based network may include multiple routers and other known network devices. In addition, multiple communication devices 110-4 may communicate with each router 280 or type of network device in the communication network 120-4.

Any device(s) or application(s) in the IP-based network (e.g., proxy servers, firewalls, or routers) may be configured to monitor and obtain state information associated with communication services provided over the network. In some embodiments, for example, the router 280 is configured with tools (e.g., software, firmware, and/or hardware) for obtaining state information. In other embodiments, the communication devices 110-4 are configured with tools for obtaining state information. In yet other embodiments, separate monitors 130 (not shown in FIG. 2) are included in the IP-based network for obtaining state information.

The collected state information can be transmitted from one or more devices of the communication network 120-4 to the aggregation engine 140, either directly or indirectly. For example, any of the network devices (e.g., the router 280) on the IP-based network may be configured to connect to the Internet and to transmit state information to the aggregation engine 140 via the Internet. In some embodiments, a gateway (not shown) may be used to interface IP-based network elements with the aggregation engine 140. In one embodiment, for example, the router 280 is configured to monitor and transmit state information to the gateway, which may be configured to format the state information for transmission to the aggregation engine 140. In other embodiments, the aggregation engine 140 may be configured to perform data format translation functions to convert IP-based signals (e.g., signals sent over DSL) to another format.

The aggregation engine 140, the data store 145, and the monitoring portal 150 shown in FIG. 2 may be configured as described above to provide aggregate state information to the user 170 via the access device 160.

The above-described systems 100 and 200 may be implemented using one or more computing devices. Thus, the systems 100 and 200 may include any computer hardware and/or instructions (e.g., software programs), or combinations of software and hardware, helpful for the performance of the monitoring and reporting processes described herein. In particular, the aggregation engine 140, the data store 145, and the monitoring portal 150 may be implemented using one or more computers. More specifically, it should be understood that the aggregation engine 140, the data store 145, and the monitoring portal 150 may be implemented on one physical computing device or may be implemented on more than one physical computing device. Accordingly, the systems 100 and 200 may include any one of a number of computing devices known to those skilled in the art, and may employ any of a number of computer operating systems known to those skilled in the art, including, but by no means limited to, known versions and/or varieties of the Microsoft Windows® operating system, the Unix operating system, and the Linux operating system.

Accordingly, those skilled in the art will recognize that the various processes described herein, including the functions of the aggregation engine 140, the data store 145, and the monitoring portal 150 in particular, may be implemented at least in part as instructions executable by one or more computing devices. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

IV. Exemplary User-Interface View

Figure 3:
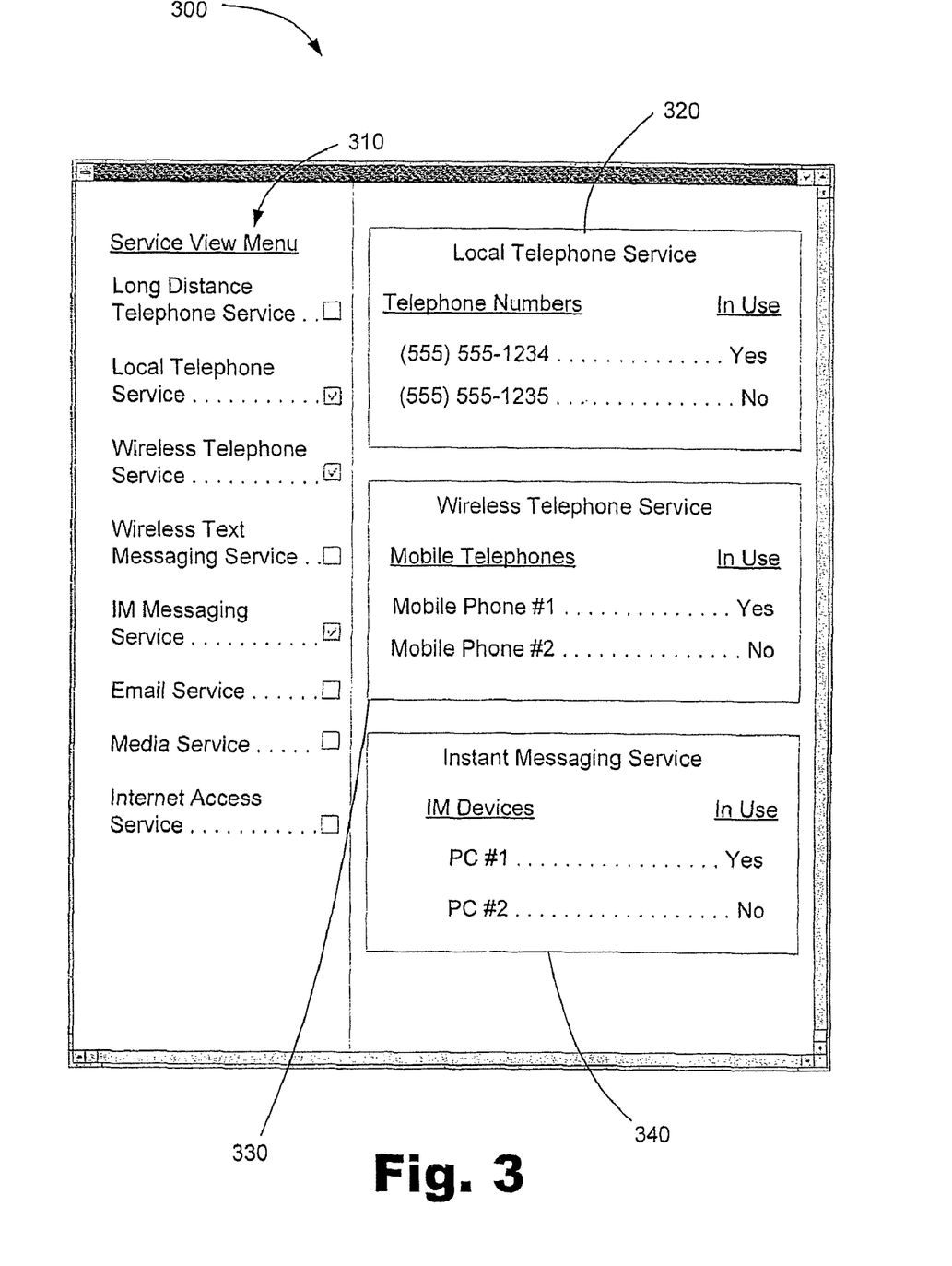
FIG. 3 is a block diagram of an exemplary user interface provided by the system of FIG. 1 or the system of FIG. 2, according to one embodiment.

The monitoring portal 150 may be configured to provide various interactive interfaces to the user 170 via the access device 160. FIG. 3 illustrates an exemplary graphical user interface ("GUI") 300 that the monitoring portal 150 may make available to the user 170. FIG. 3 is illustrative only; many other forms of graphical user interfaces and/or other types of interactive user interfaces (e.g., voice interfaces) may be provided by the monitoring portal 150. In addition, other embodiments of interactive user interfaces may present different combinations of state information. Examples of state information that may be included in interactive user interfaces will be described further below.

As shown in FIG. 3, the GUI 300 may include a service view menu 310 from which the user 170 may select from communication services that have been associated with the monitoring portal 150, as described below. The user 170 may select communication services for detailed display in the GUI 300 by checking a box or by using any other suitable selection mechanism. In FIG. 3, the selected communication services include local telephone, wireless telephone, and instant messaging services. Selection of these services causes a local telephone service report 320, a wireless telephone service report 330, and an instant messaging service report 340 to be displayed in the GUI 300.

The user 170 may select in advance the communication services to be monitored and tied to the monitoring portal 150. Typically, the user 170 may select any communication services subscribed to by the user 170. In some embodiments, the user 170 may associate communication services with the monitoring portal 150 by subscribing to a monitoring portal service provided by a carrier and notifying the carrier as to which communication services will be monitored and reported to the monitoring portal 150. The carrier can then activate the monitoring and reporting processes described herein for the selected communication services. Identifiers may be assigned to subscribers and used to organize state information by subscriber, so that the systems 100 and 200 can monitor communication services for multiple subscribers.

State information for selected communication services may be displayed in the GUI 300. In the exemplary GUI 300 of FIG. 3, the reports 320 through 340 are each configured to display state information indicative of whether a particular service associated with a monitoring portal account is in use. The local telephone service report 320 indicates whether local telephone service is in use for pre-selected telephone numbers, the wireless telephone service report 330 indicates whether wireless telephone service is in use on pre-selected mobile phones, and the instant messaging service report 340 indicates whether an instant messaging service is in use on pre-selected instant messaging devices (e.g., personal computers).

Of course, the GUI 300 of FIG. 3 is illustrative only; many other embodiments of interactive interfaces generated by the monitoring portal 150 may be used to present different types and combinations of aggregate state information for communication services provided on different communication networks 120. Accordingly, interactive interfaces generated by the monitoring portal 150 may include any state information descriptive of content and/or usage of communication services that have been tied to the monitoring portal 150, where "usage" of a communication service is meant to be understood broadly to include any information related to the communication services, including, but not limited to, information concerning the duration of, parties to, content of, and/or activities associated with the communication service.

For example, the state information in an interactive interface may include information related to the duration of use of communication services. The duration may be indicated as a time counter that is updated in real time or in near real time. Thus, for a particular telephone number or communication device 110, the monitoring portal 150 may present data representative of how long a telephone number or communication device 110 has been in use.

The state information may include information indicative of a person who is using a communication service. For example, users of communication devices 110 may enter an identifier (e.g., a username, login and/or password) to gain access to communication services. The identifier may be used to ascertain the identity of a person using a communication service. The identity of a person using a communication service may also be determined from the communication device 110, telephone number, IP address, or other identifier that has been associated with the person. The identity of the person may be included in interactive interfaces generated by the monitoring portal 150.

The state information may include information indicative of a person to whom a communication service is directed.

That is, the identity of a participant of a communication service may be ascertained and included in an interactive interface generated by the monitoring portal 150. For example, participants of a telephone call may be determined from a telephone number dialed, address book, caller identification information, or other telephone data known to those skilled in the art. Participants of a chat session may be identified from usernames, buddy lists, or IP addresses.

In some embodiments, the state information may include content-related information. For example, any content of communication services may be obtained, filtered, analyzed, and/or presented in interactive interfaces for consideration by the user 170. The user 170 may define or select specific content that will raise a flag or other alert in an interactive interface when the monitoring portal 150 recognizes the occurrence of the content in a monitored communication service. For example, the user 170 may configure the monitoring portal to issue an alert whenever select profanity or vulgarity is included in the content of a communication service or when pre-selected keywords are included (e.g., words identified in advance by user 170).

The user 170 may similarly define usage-based criteria that will cause alerts to be issued. For example, the user 170 may flag a particular person, telephone number, IP address, communication device 110, or other identifier so that any communication with the flagged person or device will cause an alert to be presented in an interactive interface. To illustrate, the user 170 may define a telephone number and other identifiers associated with a particular person to cause alerts to be issued. Accordingly, inclusion of the telephone number or other defined identifiers in state information for any monitored communication service will trigger an alert. Thus, if a child who is banned from calling a particular person contacts the person by another communication service such as text messaging over a cellular network, the monitoring portal 150 will issue an alert. Because the monitoring portal 150 can comprehensively cover different communication services or different types of communication networks, parents are less likely to be unaware of children disobeying instructions related to communications services.

The user 170 may also predefine duration thresholds or instances-of-use thresholds that will trigger alerts when surpassed. The thresholds may be on a per-communication or per-session basis, or may be a running total over a predetermined period of time (e.g., a monthly billing cycle). Other types of state information (e.g., other participant identifiers, times of day) may also be used to define and trigger alerts. By providing the user 170 with an ability to define content and or instances of usage that will trigger alerts, the user 170 has significant flexibility in monitoring multiple communications services from a single access point.

The monitoring portal 150 may be configured to present state information in real time, near real time, and/or historically. Thus, historical state information may be presented. The historical state information may be presented in the form of reports for predetermined time periods (e.g., weekly or monthly).

The monitoring portal 150 may be configured to support presentation of the state information using one or more types of user interfaces. For example, the state information may be provided in a web page, in an e-mail, or by voice interface (e.g., an automated telephone service), to name several examples.

V. Exemplary Process View

Figure 4:
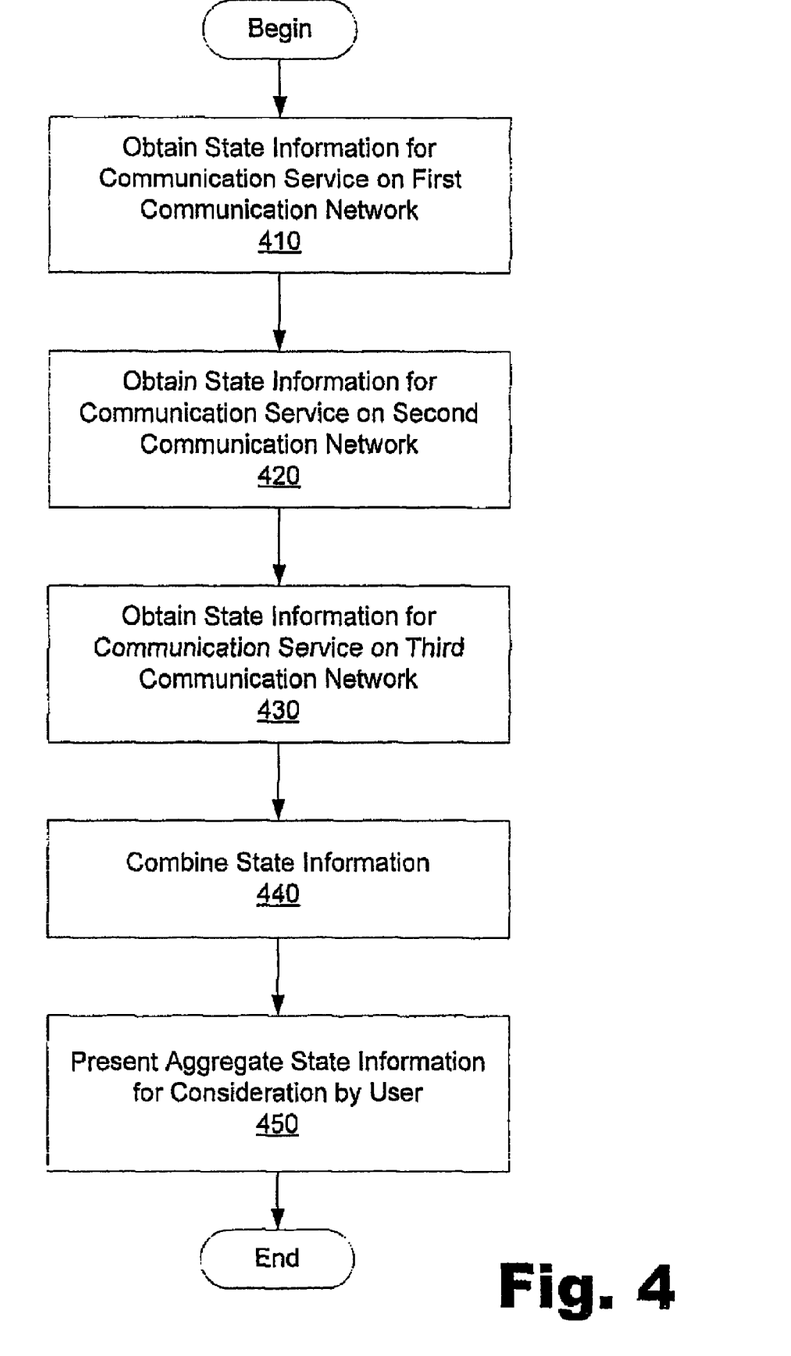
FIG. 4 is a flowchart illustrating an exemplary method for monitoring communication service usage on multiple communication networks, according to one embodiment.

FIG. 4 is a flowchart illustrating an example of a process for monitoring communication services on different types of communication networks, according to one embodiment.

While FIG. 4 illustrates exemplary steps according to one embodiment, other embodiments may omit, add to, and/or modify any of the steps shown in FIG. 4. For example, steps 410 through 430 describe the obtaining of state information on three different communication networks. However, these steps may be expanded or reduced in number to accommodate the obtaining of state information from any number of different communication networks.

The process of FIG. 4 begins by obtaining state information for one or more communication services on a first communication network (e.g., communication network 120-1 in FIG. 1) at step 410. At step 420, state information for one or more communication services on a second communication network (e.g., communication network 120-2 in FIG. 1) is obtained. At step 430, state information for one or more communication services on a third communication network (e.g., communication network 120-n in FIG. 1) is obtained. Steps 410 through 430 may be performed in any of the ways described above.

The state information obtained in steps 410-430 is combined at step 440. The state information from the different communication networks may be combined in any of the ways described above. For example, the aggregation engine 140 of FIG. 1 may be used to combine the state information.

The aggregate state information is made available to a user (e.g., a subscriber to the communication services associated with the state information) at step 450. This step is typically performed in real time or near real time and may be performed in any of the ways described above, including using the monitoring portal 150 of FIG. 1 to transmit data representative of the aggregate state information to the access device 160 of FIG. 1. The access device 160 may present the aggregate state information to the user 170 as described above.

In conclusion, the above-described exemplary systems and methods provide a robust and user-friendly tool for monitoring usage of communication services provided over multiple communication networks of different types. With the exemplary systems and methods, a user is able to monitor at a single convenient access point, the usage of multiple communication services provided on different communication networks, including the usage of landline and wireless telephone services. Usage can be monitored in real-time, in near real-time, and/or historically.

VI. Alternative Embodiments

The preceding description has been presented only to illustrate and describe embodiments of the invention. It is not intended to be exhaustive or to limit the invention to any precise form disclosed. The invention may be practiced otherwise than is specifically explained and illustrated without departing from its spirit or scope. It is intended that the scope of the invention be defined by the following claims.

What is claimed is:

1. A system, comprising:
   a monitoring portal configured to:
      receive state information descriptive of usage of a plurality of communication services provided on a plurality of communication networks of different types; and
      make said state information available with respect to said plurality of communication services, in substantially real time, by way of a plurality of identifiers, each identifier being indicative of one of said plurality of communication services and accompanied by associated state information descriptive of usage of said communication service being identified, wherein said monitoring portal includes a service view menu, said service menu being configured to receive selections of communication services associated with said monitoring portal.

2. The system of claim 1, wherein said service view menu include a selection mechanism permitting the selection of identifiers of communication services for which state information is to be made available.

3. The system of claim 1, wherein said selections of communication services are received in advance of receipt of said state information by said monitoring portal.

4. The system of claim 1, further comprising a plurality of communication services of different types, each communication service configured to report state information descriptive of usage of said respective communication service.

5. The system of claim 4, further comprising a carrier, said carrier being configured to:
  receive notification of which of said plurality of communication services are being monitored; and
  configure said communication services being monitored to report state information to said monitoring portal.

6. The system of claim 1, wherein said monitoring portal is further configured to make state information available including at least one of:
  (i) information indicative of whether a communication service is in use,
  (ii) information related to a duration of use of communication services,
  (iii) information indicative of a person who is using a communication service, and
  (iv) information indicative of a person to whom a communication service is directed.

7. A system, comprising:
  a first monitor configured to obtain first state information associated with at least one first communication service provided on a first type of communication network and associated with a subscriber identifier;
  a second monitor configured to obtain second state information associated with at least one second communication service provided on a second type of communication network different than said first type of communication network and associated with said subscriber identifier;
  an aggregation engine configured to aggregate said first information and said second information to form aggregate information descriptive of usage of both at least one first transmission media associated with the usage of said first communication service and at least one second transmission media associated with the usage of said second communication service; and
  a monitoring portal configured to make said aggregate state information available, in substantially real time, by way of identifiers of each of said first and second of communication services, each said communication service identifier being associated with state information descriptive of said respective communication services being identified, said monitoring portal further configured to insert said aggregate information in a template and send said template to an access device associated with said subscriber identifier.

8. The system of claim 7, wherein said monitoring portal is further configured to make state information available including at least one of:
  (i) information indicative of whether a communication service is in use,
  (ii) information related to a duration of use of communication services,
  (iii) information indicative of a person who is using a communication service, and
  (iv) information indicative of a person to whom a communication service is directed.

9. The system of claim 7, wherein said first type of communication network comprises a landline telephone network, and said second type of communication network comprises a wireless telephone network.

10. The system of claim 7, wherein said first type of communication network comprises an Internet-protocol-based network, and said second type of communication network comprises at least one of a public switched telephone network ("PSTN"), a wireless telephone network, and a broadcast media network.

11. The system of claim 7, wherein said monitoring portal includes a web server, said access device comprises at least one client device in communication with said web server, and said template includes a hypertext markup language template.

12. The system of claim 7, wherein said monitoring portal comprises at least one voice portal.

13. A method comprising:
  obtaining first state information descriptive of usage of at least one first communication service on a first communication network;
  obtaining second state information descriptive of usage of at least one second communication service on a second communication network, the second communication network of a different type than the first communication network;
  combining the first state information and the second state information to form aggregate information;
  making the first state information and the second state information available in substantially real time with respect to the at least one first communication service and the at least one second communication service, by way of an identifier of the first communication service accompanying associated state information descriptive of usage of the first communication service and an identifier of the second communication service accompanying associated state information descriptive of usage of the second communication service; and
  sending the aggregate state information to an access device associated with a subscriber, the aggregate state information being descriptive of states of usage of both at least one first transmission media associated with the usage of the first communication service and at least one second transmission media associated with the usage of the second communication service.

14. The method of claim 13, wherein the first communication network comprises a landline telephone network, and the second communication network comprises at least one of a wireless telephone network, an Internet protocol-based ("IP-based") network, and a broadcast media network.

15. The method of claim 13, further comprising:
  inserting the first state information and the second state information in a template;
  sending the template to the access device associated with the subscriber, the template being configured for presentation by way of the access device.

16. The method of claim 13, further comprising providing the first state information and the second state information at a single access point through which the subscriber has access to the first state information and the second state information, the first state information and the second state information being collectively descriptive of states of usage of the at least one first-transmission media and the at least one second transmission media.

17. The method of claim 13, further comprising providing state information including at least one of:
 (i) information indicative of whether a communication service is in use,
 (ii) information related to a duration of use of communication services,
 (iii) information indicative of a person who is using a communication service, and
 (iv) information indicative of a person to whom a communication service is directed.

18. The method of claim 13, further comprising receiving selections of communication services for which state information is to be made available.

19. The method of claim 13, further comprising receiving usage-based criteria configured to cause alerts to be issued, the usage-based criteria including indications of at least one of a particular person, a telephone number, an internet protocol address, and a communication device.

20. A system, comprising:
 a monitoring portal configured to:
  receive state information descriptive of usage of a plurality of communication services provided on a plurality of communication networks of different types;
  make said state information available with respect to said plurality of communication services, in substantially real time, by way of a plurality of identifiers, each identifier being indicative of one of said plurality of communication services and accompanied by associated state information descriptive of usage of said communication service being identified; and
  at least one of:
   issue an alert when at least one of profanity, vulgarity, and pre-selected keywords are included in the state information of a communication service, and
   receive usage-based criteria configured to cause alerts to be issued, said usage-based criteria including indications of at least one of a particular person, a telephone number, an internet protocol address, and a communication device.

21. A method comprising:
 obtaining first state information descriptive of usage of at least one first communication service on a first communication network;
 obtaining second state information descriptive of usage of at least one second communication service on a second communication network, the second communication network of a different type than the first communication network;
 making the first state information and the second state information available in substantially real time with respect to the at least one first communication service and the at least one second communication service, by way of an identifier of the first communication service accompanying associated state information descriptive of usage of the first communication service and an identifier of the second communication service accompanying associated state information descriptive of usage of the second communication service; and
 issuing an alert when at least one of profanity, vulgarity, and pre-selected keywords are included in state information of a communication service.

\* \* \* \* \*